United States Patent

[11] 3,586,132

[72] Inventor Keith W. Tantlinger
 Grosse Pointe Shores, Mich.
[21] Appl. No. 826,891
[22] Filed May 22, 1969
[45] Patented June 22, 1971
[73] Assignee Fruehauf Corporation
 Detroit, Mich.

[54] OUTBOARD MOUNTED BRAKE
 2 Claims, 3 Drawing Figs.
[52] U.S. Cl. .................................................. 188/18 A,
 152/417, 188/72.4, 188/73.5, 188/218 A,
 188/370, 192/70.2
[51] Int. Cl. .................................................. B60t 1/06,
 F16d 55/224
[50] Field of Search ...................................... 188/18 A,
 71.1, 72.4, 152.873, 71.5, 73.5, 205.3, 218 A;
 152/417, 70.2

[56] References Cited
UNITED STATES PATENTS
| | | | |
|---|---|---|---|
| 2,764,261 | 9/1956 | Bridges | 188/73.5 |
| 3,191,735 | 6/1965 | Wavak | 192/70.2 X |
| 839,626 | 12/1906 | Nielsen | 152/417 |
| 2,648,571 | 8/1953 | Chapin | 188/18 (A) X |
| 2,659,458 | 11/1953 | Mercier | 188/72.4 X |
| 3,061,050 | 10/1962 | Horn | 188/18 (A) X |
| 3,276,503 | 10/1966 | Kilmarx | 152/417 |

FOREIGN PATENTS
| | | | |
|---|---|---|---|
| 774,700 | 5/1957 | Great Britain | 188/72.4 |

Primary Examiner—George E. A. Halvosa
Attorney—Bryan and Butrum

ABSTRACT: A nonrotatable axle carries wheel support means upon which a wheel is rotatably journaled. A brake disc is drivingly connected with the wheel for rotation therewith. A caliper means engageable with said brake disc is connected with the axle means and held against rotation with respect thereto. Both the brake disc and the caliper means are disposed outboard of the wheel support means.

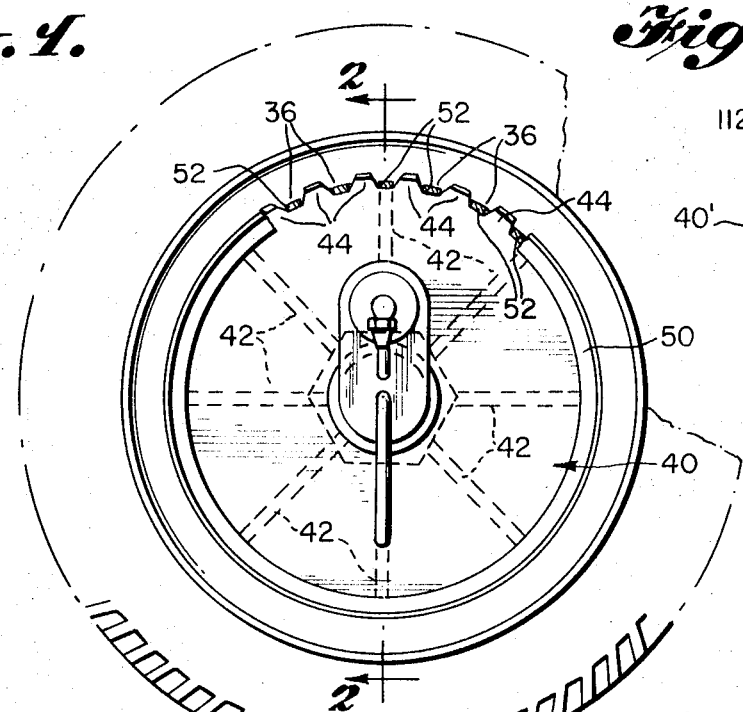
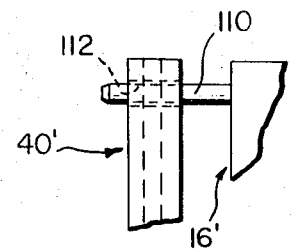
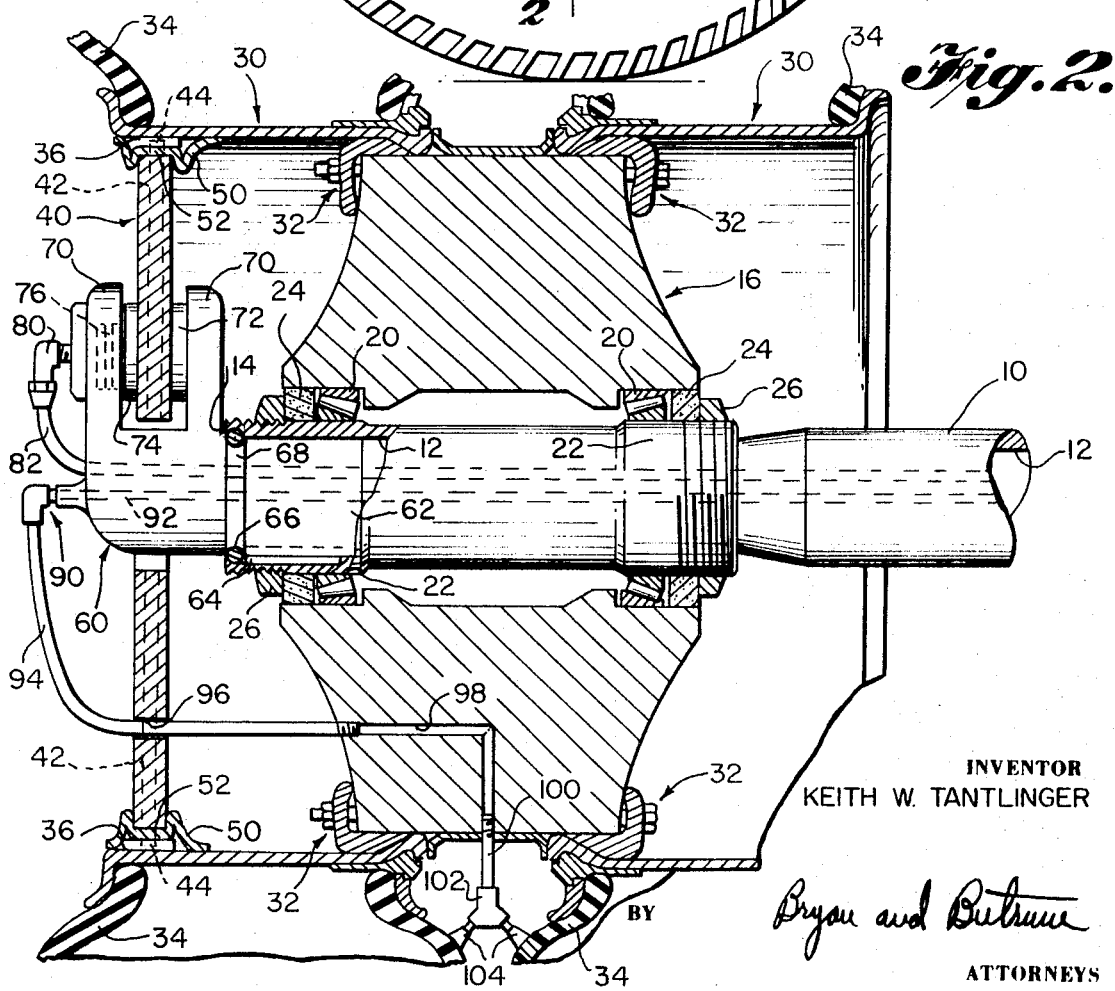
INVENTOR
KEITH W. TANTLINGER
BY Bryan and Bethune
ATTORNEYS

OUTBOARD MOUNTED BRAKE

BACKGROUND OF THE INVENTION

The present invention relates to a brake for use on automotive vehicles such as trucks, tractors, trailers and the like, and, more particularly, to a disc brake employed with a dead or nonrotatable axle.

In the past, brake mechanisms associated with the wheel means of automotive vehicles have been positioned inboard of the wheel support means since it was considered advisable to so position the brake means in order to protect the brake mechanism.

However, such conventional prior art arrangements suffer from a number of disadvantages. Firstly, it is difficult to gain access to the brake mechanism, and, accordingly, maintenance of the brake means as well as replacement of parts thereof is difficult. Furthermore, when working on such inboard mounted brake constructions, the wheel bearing adjustment is often disturbed and loss of lubricant and contamination thereof occurs.

A further disadvantage of known inboard mounted brake mechanisms is the fact that cooling of the brake components is not satisfactory, and consequently such arrangements often produce excessive heating of the brake components. Additionally, visual inspection of the parts of the brake mechanism is difficult.

SUMMARY OF THE INVENTION

The present invention includes a nonrotatable or dead axle having wheel support means and wheel means rotatably journaled by such wheel support means. The brake means includes a brake disc drivingly interconnected with the wheel means as well as a caliper means which is engageable with the brake disc, the caliper means being connected with the outer end of the axle.

Both the brake disc and the caliper means in the present invention are supported outboard of the the wheel support means thereby overcoming the aforementioned disadvantages of the prior art and providing significant advantageous features.

The outboard mounted brake means of the present invention provides ready access for maintenance or replacement of parts of the brake means without disturbing the wheel-bearing adjustment or risking lubricant loss or contamination.

The brake means is also afforded maximum cooling to thereby substantially reduce the possibility of the brake components overheating during use. In addition, visual inspection of the various parts of the brake are greatly simplified.

A further advantage of the present invention is that it enables dual tire inflation as well as balance of pressure between two side-by-side tires while in transit. The tire pressures can also be monitored at all times. Still a further advantage of the outboard mounted brake mechanism is the fact that it provides a relatively simple arrangement for attaching an antiskid sensing and modulating device of known construction.

BRIEF DESCRIPTION OF THE DRAWING

FIG. 1 is an end view of an outboard-mounted brake according to the present invention, FIG. 2 is a sectional view on an enlarged scale taken substantially along line 2-2 of FIG. 1 looking in the direction of the arrows, and FIG. 3 is a cut away view of a modified form of the invention.

DESCRIPTION OF THE PREFERRED EMBODIMENTS

Referring now to the drawings wherein like reference characters designate corresponding parts throughout the various views, a nonrotatable or dead axle 10 of a vehicle is provided with a longitudinally extending bore 12 formed therethrough which opens through the outer end 14 thereof.

A wheel means includes a wheel hub 16 rotatably journaled on bearings 20 which are, in turn, supported upon spaced cylindrical portions 22 of the axle. Seals 24 are disposed adjacent to each of the bearings 20, these seals being disposed in surrounding relationship to the portions 22 of the axle. Nuts 26 are threaded on suitable threads provided on portions 22 of the axle for retaining the bearings and seals in the operative illustrated relationship.

A pair of conventional wheel rims 30 are supported on hub 16 by clamping mechanisms indicated generally by reference numeral 32. Conventional inflatable rubber tires 34 are supported on the wheel rims in the usual manner. The outboard wheel rim is provided with a plurality of circumferentially spaced teeth 36 formed around the inner periphery thereof and extending radially inwardly.

A brake disc 40 has radially extending slots 42 formed therethrough through which air may circulate during operation of the apparatus to cool the brake disc. A plurality of circumferentially spaced radially outwardly directed teeth 44 are provided on the outer periphery of the brake disc and mesh with the teeth 36 formed on the outboard rim of the wheel so as to prevent relative rotation of the brake disc with respect to the wheel rim, but permitting axial movement of the brake disc with respect to the rim.

A rolled spring steel annular centering ring 50 includes portions 52 which extend between adjacent teeth 44 formed on the outer periphery of the brake disc. This centering ring maintains proper axial alignment of the brake disc during all phases of operation of the brake mechanism.

A caliper is indicated generally by reference numeral 60 and includes a cylindrical portion 62 which fits snugly within the outer end of bore 12 formed through the axle. Portions 62 of the caliper carries keys 64 which fit within slots formed in the axle so as to prevent relative rotation between the caliper and the axle. The caliper may also be prevented from rotating with respect to the axle by machining splines in the axle and in portion 62 of the caliper. The caliper is held in place by a snap ring 66 fitting within a groove 68 provided in the caliper.

The caliper includes a bifurcated portion defining two spaced parts 70. A friction pad 72 is fixed to one of the parts 50 of the caliper, and a friction pad 74 is carried by a movable piston means 76 which is slideably mounted within a recess provided in the associated part of the caliper. Fluid pressure for operating piston 76 is provided through a fitting 80 connected with a fluid line 82. Line 82 extends through a suitable bore provided in the caliper as well as the bore 12 in the axle and is connected with a source of fluid pressure which is adapted to be selectively controlled for operating the brake when desired.

A conventional swing joint 90 is connected with the outer end of the caliper and is in communication with a fluid line 92, extending through a suitable bore provided in the caliper and thence through bore 12 formed in the axle. Line 92 is connected with a source of air pressure for maintaining the rubber tires at a desired degree of inflation.

The swing joint is also in communication with a fluid line 94 which extends through a hole 96 provided in brake disc 40. The fluid line is, in turn, connected with the hub 16 and is in communication with a passage 98 formed through the hub. Passage 98 is, in turn, in communication with a fluid line 100 which is connected with a T-joint 102. The T-joint is connected with the tire tube valve stems 104 of the rubber tires 24, the valves having been removed whereby transfer and balance of the fluid in the two side-by-side tires is afforded.

Referring now to FIG. 3 of the drawings, a modified form of the invention is illustrated. A wheel hub 16' and a brake disc 40' correspond to similarly numbered parts in FIG. 2. In this form of the invention, a plurality of studs 110 are anchored to the wheel hub and extend laterally outwardly thereof. These studs are received within complementary holes 112 provided in the brake disc whereby the brake disc is connected for rotation with the wheel means and at the same time is free to move axially with respect thereto and is not restrained from axial movement.

While a flat brake disc has been illustrated, the brake disc could also be cup-shaped if so desired. The peripheral flange portion of such a cup-shaped brake disc may be provided with notches engageable with complementary protuberances connected either with the wheel hub or the wheel rim. Such protuberances could be, for example, in the form of wheel spokes or rim studs and the like. While a single brake disc has been illustrated, a multiple disc arrangement may also be employed if so desired.

An antiskid sensing and modulating device may be readily employed with the outboard brake means of the present invention. Such devices are available as an option on certain automobiles and are used particularly on airplane wheel brakes, and the device senses abrupt decelerations of rotating wheels, such as occurs when a tire skids, and transfers this signal to the hydraulic fluid pressure being applied to the brakes. In some devices the pressure is reduced to a predetermined low rate of deceleration and in other devices the hydraulic pressure is rapidly cycled. Such an antiskid and modulating device can be mounted on the nonrotating axle. A sensing element can be supported by the axle adjacent to the rotating brake disc. The sensing element may, for example, be an electrical coil, the core of which is magnetic and therefore electrically sensitive to variations in flux due, for example, to iron protuberances carried by the rotating element and moving past the core of such electrical coil.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. An outboard mounted brake comprising axle means, wheel support means on said axle means, wheel means rotatably supported by said wheel support means, brake means including a first brake portion and a second cooperating brake portion engageable with said first brake portion, each of said first and second brake portions being disposed outboard of said wheel support means, said first brake portion comprising a brake disc drivingly interconnected with said wheel means, said second brake portion comprising caliper means, said axle means having a bore formed longitudinally therethrough and opening through the outer end thereof, said caliper means including a portion fitted within the open outer end of said bore in the axle means for supporting said caliper means on said axle means, means preventing relative rotation of said portion of the caliper means with respect to said axle means, a fluid line extending through said caliper means, said brake disc having a hole formed therethrough, and a further fluid line connected with said first-mentioned fluid line and extending through said hole in the brake disc, said wheel means including inflatable tires, said last-mentioned fluid line being connected with said tires to provide tire inflation and pressure balancing between the tires.

2. An outboard-mounted brake comprising axle means, wheel support means on said axle means, wheel means rotatably supported by said wheel support means, brake means including a first brake portion and a second cooperating brake portion engageable with said first brake portion, each of said first and second brake portions being disposed outboard of said wheel support means, said first brake portion comprising a brake disc drivingly interconnected with said wheel means, said second brake portion comprising caliper means, said axle means having a bore formed longitudinally therethrough and opening through the outer end thereof, said caliper means including a portion fitted within the open outer end of said bore in the axle means for supporting said caliper means on said axle means, means preventing relative rotation of said portion of the caliper means with respect to said axle means, an annular centering means operatively engaged with the outer periphery of said brake disc and being positioned between the outer periphery of said brake disc and the inner periphery of a portion of said wheel means for retaining the brake disc in proper centered orientation relative to said wheel means, said centering means comprising a resilient relatively rigid ring, said brake disc having spaced teeth formed thereon, said ring including portions extending between adjacent teeth on the brake disc.